US007097395B2

(12) United States Patent
Horiuchi et al.

(10) Patent No.: US 7,097,395 B2
(45) Date of Patent: Aug. 29, 2006

(54) CHIP-BREAKING TOOL FOR TAPPING AND FEMALE THREAD PROCESSING METHOD

(75) Inventors: Osamu Horiuchi, 11-8, Noyoridai 1-chome, Toyohashi-shi, Aichi-ken (JP); Yoshihiko Murakami, Toyohashi (JP)

(73) Assignees: OSG Corporation, Toyokawa (JP); Osamu Horiuchi, Toyohashi (JP)

( * ) Notice: Subject to any disclaimer, the term of this patent is extended or adjusted under 35 U.S.C. 154(b) by 74 days.

(21) Appl. No.: 10/901,166

(22) Filed: Jul. 29, 2004

(65) Prior Publication Data

US 2005/0053437 A1 Mar. 10, 2005

Related U.S. Application Data

(60) Provisional application No. 60/498,600, filed on Aug. 29, 2003.

(51) Int. Cl.
*B23B 51/08* (2006.01)

(52) U.S. Cl. .......................... 408/1 R; 408/24; 408/30; 408/118; 408/222; 470/199; 409/259

(58) Field of Classification Search ................ 408/1 R, 408/19, 22, 24, 30, 118, 222, 225; 470/199; 409/259, 260
See application file for complete search history.

(56) References Cited

U.S. PATENT DOCUMENTS 1,952,194 A * 3/1934 Drissner .................... 409/244
3,847,056 A * 11/1974 Roger ........................ 409/59
4,872,793 A * 10/1989 Minagawa et al. ......... 409/244
5,439,335 A * 8/1995 Curtis et al. ............... 409/259

FOREIGN PATENT DOCUMENTS

EP 104694 A1 * 4/1984
GB 2067440 A * 7/1981
JP 52008589 A * 1/1977
JP 52-26698 2/1977
JP A 2003-270846 9/2003

* cited by examiner

*Primary Examiner*—Monica Carter
*Assistant Examiner*—Ali Abdelwahed
(74) *Attorney, Agent, or Firm*—Oliff & Berridge, PLC

(57) ABSTRACT

Since the chip-breaking groove 30 is cut in the inner peripheral surface of the prepared hole 22 by compressing the chip-breaking tool 10 into the prepared hole 22 prior to the tapping process (the cutting process of the female thread) by the cut tap, the chip can be securely broken by the chip-breaking groove 30 and well discharged even in the case that the work 20 is made of the material having the high ductility. Accordingly, for example, as shown in FIG. 10, it is possible to prevent a lot of long connected chips from entwining the tap, it is unnecessary to monitor the tapping work, and it is possible to achieve a complete automation (an unmanned work). Further, it is possible to inhibit the cut tap from being broken due to the pinching of the chip, and it is easy to execute a treatment such as a chip cleaning or the like.

10 Claims, 7 Drawing Sheets

(a) Chip-breaking tool 10
12
16
16 Groove processing blades
18
14 28 26 28 26 24

(b) 26 16 28 24 Insertion guide 16 16 26 28

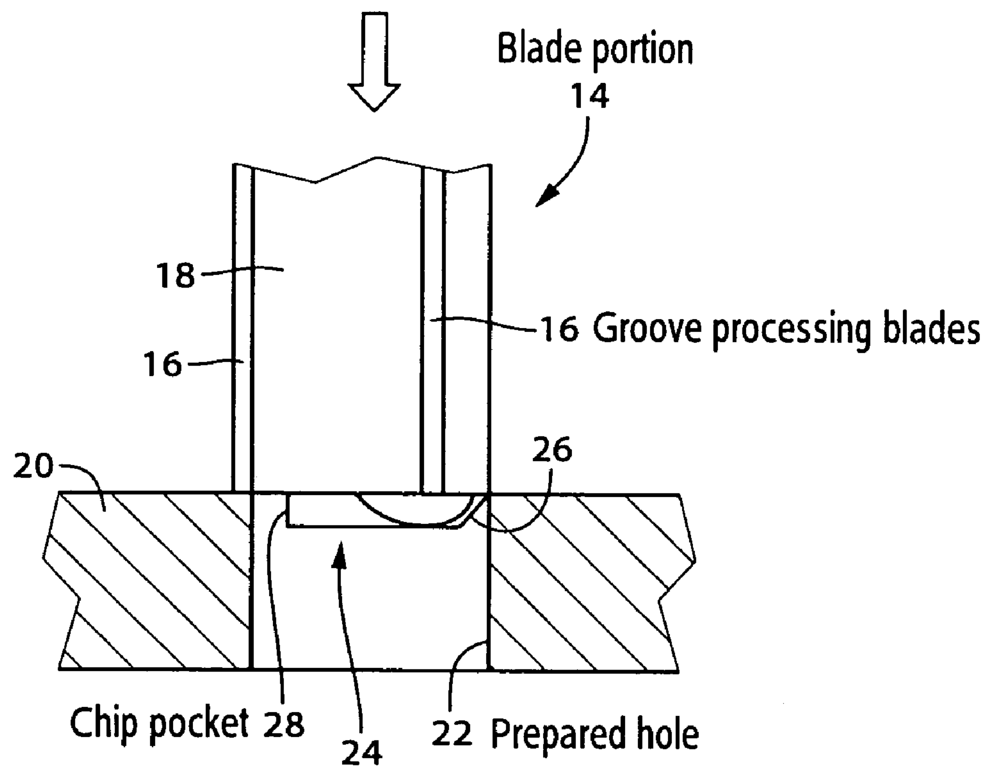
FIG. 2
FIG. 3
(a)
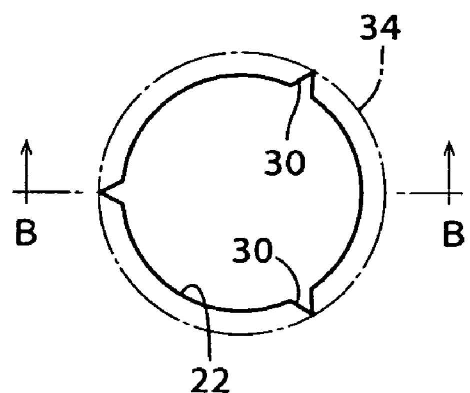
(b)
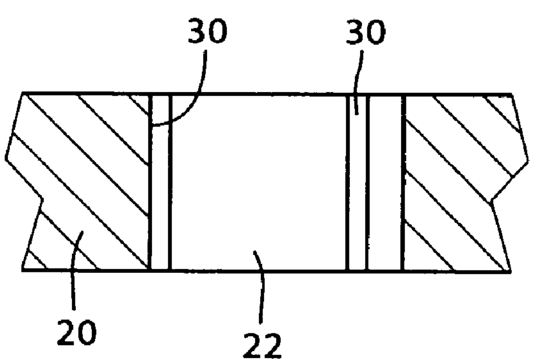

FIG. 4
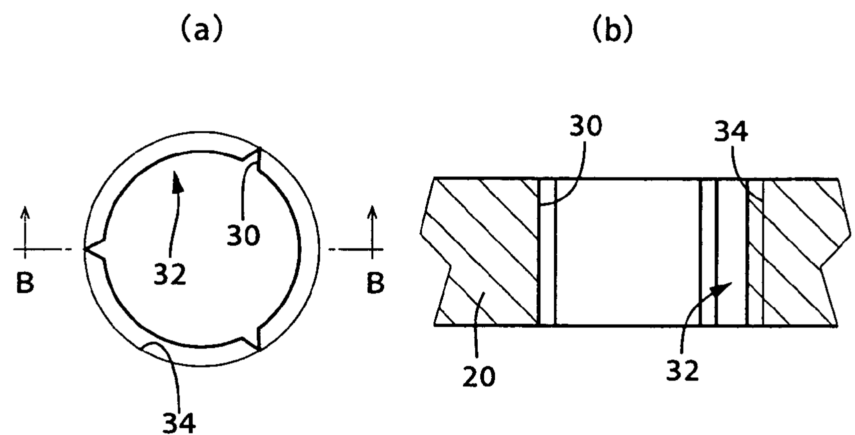
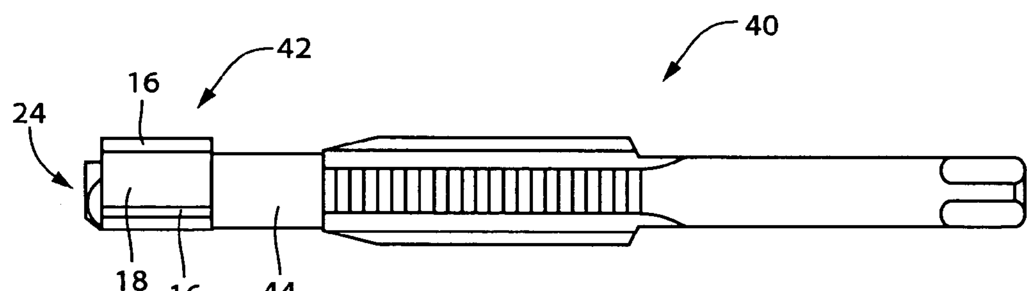
FIG. 5
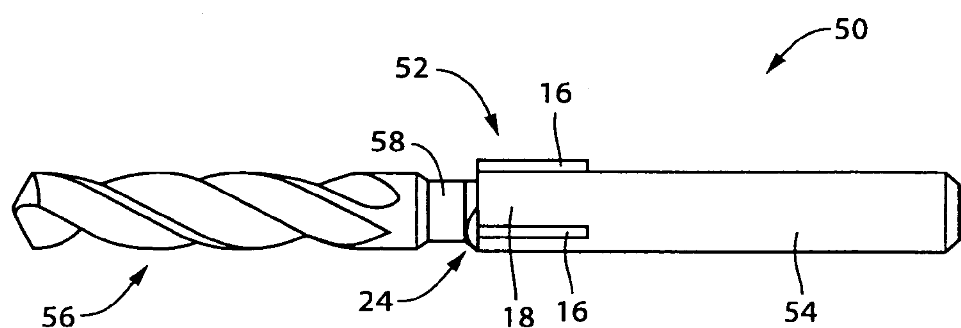
FIG. 6

(a)

(b)

(c)

CHIP-BREAKING TOOL FOR TAPPING AND FEMALE THREAD PROCESSING METHOD

This nonprovisional application claims the benefit of U.S. Provisional Application No. 60/498,600, filed Aug. 29, 2003.

This application is based on Japanese Patent Application No. 2003-270846 filed on Jul. 3, 2003, the contents of which are incorporated hereinto by reference.

BACKGROUND OF THE INVENTION

1. Field of the Invention

The present invention relates to an improvement of a female thread processing method of screwing a cut tap into a prepared hole so as to cut a female thread.

2. Discussion of Related Art

A female thread processing method of screwing a cut tap into a prepared hole so as to cut a female thread is widely applied to various fields. However, in the case of tapping a material having a high ductility, for example, SS400 (an ordinary structural rolled steel), an aluminum and the like by using the cut tap, the chips are hard to be broken so as to tend to be connected long. Accordingly, there is a case that the chips entwine the tap so as to make the processing impossible as shown in FIG. 10. Therefore, it is necessary for an operator to always monitor, and there is a problem that it is hard to achieve a complete automation. Further, there is a risk that the tap is broken due to pinching of the chips, and there are various problems such that it is hard to execute a process such as a cleaning work of the chips, and the like. On the contrary, in the case that a plurality of notches corresponding to a land of the cut tap are provided in an outer peripheral portion of the prepared hole, as described in patent JP-A S52-26698, the chips are broken in pieces by the notches. Accordingly, the problems mentioned above can be solved.

However, in the processing method described in the patent document 1 mentioned above, since the female thread itself is largely broken by the comparatively large notches corresponding to the land of the cut tap, there is a risk that a strength of the female thread is lowered, and a predetermined screwing strength can not be obtained. In particular, since it is impossible to strongly fasten the material in the case of the material having the high ductility, it is substantially hard to apply the technique described in the JP-A S52-26698.

SUMMARY OF THE INVENTION

The present invention is made on the basis of the circumstances mentioned above, and an object of the present invention is to securely break a chip without deteriorating a strength of a female thread, even in the case of tapping the female thread with respect to a material having a high ductility.

The above object maybe achieved according to a first aspect of the present invention which provides, a chip-breaking tool for tapping which prevents chips from being long connected and discharged at a time of screwing a cut tap into a prepared hole so as to cut a female thread, comprising: (a) a main body portion which is inserted into said prepared hole prior to a cutting process of said female thread by said cut tap; and (b) a groove processing blade which is integrally provided in said main body portion and forms a chip-breaking groove in an inner peripheral surface of said prepared hole.

In the first preferred form of the chip-breaking tool for tapping according to the first aspect of the invention, the groove processing blade cuts a notch-shaped chip-breaking groove having an approximately triangular cross section, and a diameter of said groove processing blade is approximately equal to a root diameter of said female thread.

In the second preferred form of the chip-breaking tool for tapping according to the first aspect of the invention, the main body portion is provided with a cylindrical outer peripheral surface having a diameter which is approximately equal to an inner diameter of said prepared hole, and is inserted into said prepared hole in a state of being positioned approximately concentric to said prepared hole by said cylindrical outer peripheral surface.

In the third preferred form of the chip-breaking tool for tapping according to the first aspect of the invention, a taper-shaped insertion guide in which a diameter is smaller toward a leading end side from a large-diameter portion approximately equal to a diameter of said prepared hole is provided in a leading end of the main body portion.

In the fourth preferred form of the chip-breaking tool for tapping according to the first aspect of the invention, the groove processing blade forms said chip-breaking groove in accordance with a cutting process, and a portion matching to the groove processing blade in said insertion guide is partly notched, and is provided with a chip pocket which receives the chips cut by the groove processing blade and discharge forward.

In the fifth preferred form of the chip-breaking tool for tapping according to the first aspect of the invention, the main body portion is integrally provided with a shank in an axial direction, and is independently mounted to a machine tool so as to be used.

In the sixth preferred form of the chip-breaking tool for tapping according to the first aspect of the invention, the main body portion having said groove processing blade is integrally provided in a leading end portion of the cut tap.

In the seventh preferred form of the chip-breaking tool for tapping according to the first aspect of the invention, the main body portion having said groove processing blade is integrally provided between a groove portion of a drill cutting said prepared hole and a shank.

In the eighth preferred form of the chip-breaking tool for tapping according to the first aspect of the invention, the main body portion having said groove processing blade is integrally provided between a drill of a cut tap with said drill and said cut tap.

The object indicated above may also be achieved according to a second aspect of the present invention which provides, a female thread processing method of screwing a cut tap into a prepared hole so as to cut a female thread, comprising: a groove processing step of forming a chip-breaking groove in an inner peripheral surface of said prepared hole so as to cross to a thread groove of said female thread prior to a cutting process of said female thread by said cut tap.

In the first preferred form of the female thread processing method of screwing a cut tap into a prepared hole so as to cut a female thread according to the second aspect of the invention, the chip-breaking groove is provided such that a bottom diameter is approximately equal to a root diameter of said female thread.

According to the chip-breaking tool for tapping on the basis of the first aspect of the invention, since the tool is inserted into the prepared hole prior to the tapping process (the cutting process of the female thread) by the cut tap, whereby the chip-breaking groove is formed in the inner peripheral surface of the prepared hole, the chip can be securely broken by the chip-breaking groove so as to be well discharged, even in the case of tapping the material having the high ductility. Accordingly, it is possible to prevent a lot of chips which are not broken and connected long from entwining the tap, and it is not necessary to monitor the tapping work, so that it is possible to achieve a complete automation (an unmanned process). Further, it is possible to inhibit the cut tap from being broken due to the pinching of the chips, and it is easy to execute a process of cleaning the chips or the like.

On the other hand, the female thread obtained by tapping is broken by the chip-breaking groove, however, since it is sufficient that the chip-breaking groove breaks the chips generated at a time of tapping, the chip-breaking groove may be provided at a minimum magnitude, for example, a structure in accordance with the first preferred form of the first aspect of the invention that a notch-shaped chip-breaking groove having an approximately triangular cross section is formed at a diameter which is approximately equal to a root diameter of the female thread. Accordingly, a strength of the female thread becomes higher than the case that the large notch corresponding to the land of the tap is provided as described in the patent document 1 mentioned above, so that it is possible to secure a predetermined screwing strength even in the material having the high ductility.

In accordance with the second preferred form of the first aspect of the invention, since the main body portion is provided with the cylindrical outer peripheral surface having the diameter which is approximately equal to the inner diameter of the prepared hole, and the chip-breaking groove is processed by inserting the main body into the prepared hole in a state of being positioned approximately concentric to the prepared hole by the cylindrical outer peripheral surface, it is possible to process the chip-breaking groove at a high precision, and it is possible to easily process the chip-breaking groove even in the case that the number of the groove processing blade is one.

In accordance with the third preferred form of the first aspect of the invention, since the taper-shaped insertion guide in which the diameter is smaller toward the leading end side from the large-diameter portion approximately equal to the diameter of the prepared hole is provided in the leading end of the main body portion, it is possible to easily and securely insert the tool into the prepared hole so as to process the chip-breaking groove.

In accordance with the fourth preferred form of the first aspect of the invention, since the chip pocket is provided in a state in which the portion matching to the groove processing blade in the insertion guide mentioned above is partly notched, the chips cut by the groove processing blade are well discharged forward from the chip pocket, and it is possible to prevent the chips from being pinched between the insertion guide and the prepared hole so as to increase the process load, and prevent any scratch from being formed on the inner peripheral surface of the prepared hole.

In accordance with the fifth preferred form of the first aspect of the invention, since the chip-breaking tool for tapping is integrally provided with the shank in the axial direction, and is independently mounted to the machine tool so as to be used, the chip-breaking tool can be used in common with the tapping process of plural kinds of female threads having different pitches as far as the diameter of the prepared hole is fixed. Further, in comparison with the case that the chip-breaking tool is integrally provided with the cut tap or the drill as in the seventh invention to the ninth invention, the chip-breaking tool can be used until each of the tools reaches a tool life due to an abrasion, a damage and the like, and it is possible to effectively utilize each of the tools.

In accordance with the sixth preferred form of the first aspect of the invention, since the chip-breaking tool is integrally provided in the leading end portion of the cut tap, it is possible to continuously and efficiently execute the tapping process by means of the cut tap subsequently after processing the chip-breaking groove by the chip-breaking tool, without changing the tool. In this case, at a time of pulling out the chip-breaking tool from the female thread after tapping, it is preferable to pull out by aligning the phase of the groove processing blade with the chip-breaking groove existing in the female thread.

In accordance with the seventh preferred form of the first aspect of the invention, since the chip-breaking tool is integrally provided in the drill, it is possible to continuously and efficiently process the chip-breaking groove by means of the chip-breaking tool subsequently after processing the prepared hole by the drill, without changing the tool. Further, in the case that the diameter of the prepared hole is fixed in the same manner as the sixth invention, the tool can be used in common with the tapping process of plural kinds of female threads having different pitches.

In accordance with the eighth preferred form of the first aspect of the invention, since the chip-breaking tool is integrally provided in the drilled cut tap, it is possible to continuously and efficiently execute the prepared hole process by means of the drill, the chip-breaking groove process by means of the chip-breaking tool, and the tapping process by means of the cut tap, without changing the tool. In this case, at a time of pulling out the chip-breaking tool from the female thread after tapping, it is preferable to pull out by aligning the phase of the groove processing blade with the chip-breaking groove existing in the female thread.

In accordance with the female thread processing method on the basis of the second aspect of the invention, since the chip-breaking groove is formed in the inner peripheral surface of the prepared hole prior to the tapping process by means of the cut tap, the chips can be securely broken by the chip-breaking groove so as to be well discharged, even in the case of tapping the material having the high ductility, so that the same effect as that of the first invention can be obtained.

In accordance with the first preferred form of the second aspect of the invention, since the bottom diameter of the chip-breaking groove is approximately equal to the root diameter of the female thread, and the chip-breaking groove is provided at the approximately same depth as the thread groove of the female thread, the strength of the female thread becomes higher in comparison with the case that the large notch corresponding to the land of the tap as in the patent document 1 mentioned above is provided, and it is possible to secure a predetermined screwing strength even in the material having the high ductility.

Preferably, the chip-breaking groove in accordance with the present invention may be constituted by a linear groove which is formed in parallel to an axis of the prepared hole by inserting the chip-breaking tool in parallel to the axis of the prepared hole without rotating around the axis, however, may be provided so as to cross the thread groove of the female thread formed in the inner peripheral surface of the prepared hole as in the tenth invention, and may be structured such that a spiral chip-breaking groove is formed by inserting the chip-breaking tool into the prepared hole while rotating around the axis. In the case of the linear groove, the groove processing blade may be provided linearly in the main body portion in parallel to the axis, and in the case of the spiral groove, the groove processing blade may be provided so as to be twisted around the axis.

Preferably, the chip-breaking tool may be structured such that a cutting blade is provided in a leading end of the groove processing blade so as to cut the chip-breaking groove, however, may be structured such that the groove processing blade eats into the inner peripheral surface of the prepared hole so as to be plastically deformed, thereby forming the chip-breaking groove. The groove processing blade may be integrally provided with the main body portion in accordance with a cutting operation by the cutting process, a wire cut electric discharge machining or the like, however, may be independently structured so as to be integrally fixed to the main body portion by means of a fixing means such as a screw, a welding operation, a shrink fitting operation and the like.

Preferably, it is desirable that three or more groove processing blades are provided apart from each other around the axis, for example, at a uniform angular interval, however, in the case of having the cylindrical outer peripheral surface which is approximately equal to the inner diameter of the prepared hole (to be exact, slightly smaller than the prepared hole) as in the third invention, it is possible to process the chip-breaking groove at a sufficient processing accuracy only by the provision of one or two groove processing blades. In addition to the third invention, various aspects can be employed, for example, an aspect that the cross sectional shape of the main body portion is a polygonal shape such as a triangular shape, a square shape and the like, and apexes thereof can be used as the groove processing blade, and the like. In this case, since the chip generated at a time of tapping is finely broken and easily discharged in accordance with an increase of the number of the chip-breaking grooves, it is desirable to simultaneously form a plurality of chip-breaking grooves by arranging a plurality of groove processing blades.

In accordance with the first preferred form of the first aspect of the invention, the cross section of the groove working blade is the approximately triangular shape, and the notch-shaped chip-breaking groove having the approximately triangular cross section is formed, the cross sectional shape of the groove processing blade and the chip-breaking groove can be appropriately set such as a U-shaped cross section and an I-shaped cross section. In this case, the chip-breaking groove is not necessarily structured such that the land of the cut tap can pass therethrough as in the cited document 1 mentioned above, but may be provided at a width sufficiently smaller than the land.

Further, in accordance with the first preferred form of the first aspect of the invention, the diameter of the groove processing blade is approximately equal to the root diameter of the female thread, and the chip-breaking groove is formed at the groove depth which is approximately equal to the thread groove of the female thread. However, the structure may be made such that the chip-breaking groove which is deeper than the thread groove of the female thread is processed within a range in which a predetermined female thread strength can be obtained. Further, since the chip can be securely broken and discharged in the range of the groove depth of the chip-breaking groove, even in the case that the groove depth of the chip-breaking groove is shallower than the thread groove of the female thread, it is possible to inhibit the chip from entwining the tap.

The insertion guide in accordance with the third preferred form of the first aspect of the invention and the chip pocket in accordance with the fourth preferred form of the first aspect of the invention may be provided as occasion demands, and the insertion guide or the chip pocket may not be provided at a time of carrying out the other inventions.

In accordance with the sixth to eighth preferred form of the first aspect of the inventions, the chip-breaking tool may be integrally provided in the common tool material with the drill, the cut tap and the drilled cut tap, however, may be structured as a separate body and integrally bonded in accordance with a welding operation, a shrink fitting or the like. As the cut tap, various taps such as a straight groove tap, a spiral tap and the like can be employed, and the same matter is applied to the drill.

In the female thread processing method in accordance with the second aspect of the invention and the first preferred form of the second aspect of the invention, the chip-breaking tool in accordance with the first invention to the ninth invention can be preferably employed, however, it is possible to process the chip-breaking groove on the basis of the other groove processing techniques such as a laser process, an electric discharge machining and the like.

The tapping after processing the chip-breaking groove may be constituted by a process of cutting only the thread groove such that the inner peripheral surface of the prepared hole structures the crest of the female thread, or a process of cutting to the crest of the female thread.

BRIEF DESCRIPTION OF THE DRAWINGS

The above and other objects, features, advantages and technical and industrial significances of the present invention will be better understood by reading the following detailed description of presently preferred embodiment of the invention, when considered in connection with the accompanying drawings, in which:

FIGS. 1A and 1B are views showing a chip-breaking tool for tapping in accordance with an embodiment of the present invention, in which FIG. 1A is a front elevational view as seen from a direction perpendicular to an axis, and FIG. 1B is a bottom elevational view as seen from a leading end side;

FIG. 2 is a cross sectional view at a time of processing a chip-breaking groove in a prepared hole by using the chip-breaking tool shown in FIGS. 1A and 1B;

FIGS. 3A and 3B are views showing the prepared hole in which the chip-breaking groove is provided in the manner shown in FIG. 2, in which FIG. 3A is a plan view and FIG. 3B is a cross sectional view along a line B—B in FIG. 3A;

FIGS. 4A and 4B are views showing a state in which a female thread is cut in the prepared hole shown in FIG. 3 in accordance with a tapping process, in which FIG. 4A is a plan view and FIG. 4B is a cross sectional view along a line B—B in FIG. 4A;

FIG. 5 is a view showing another embodiment in accordance with the present invention, which corresponds to a case that the chip-breaking tool is integrally provided in a cut tap;

FIG. 6 is a view showing the other embodiment in accordance with the present invention, which corresponds to a case that the chip-breaking tool is integrally provided in a drill;

DETAILED DESCRIPTION OF THE PREFERRED EMBODIMENTS

A description will be in detail given below of embodiments in accordance with the present invention with reference to the accompanying drawings.

Figure 1:
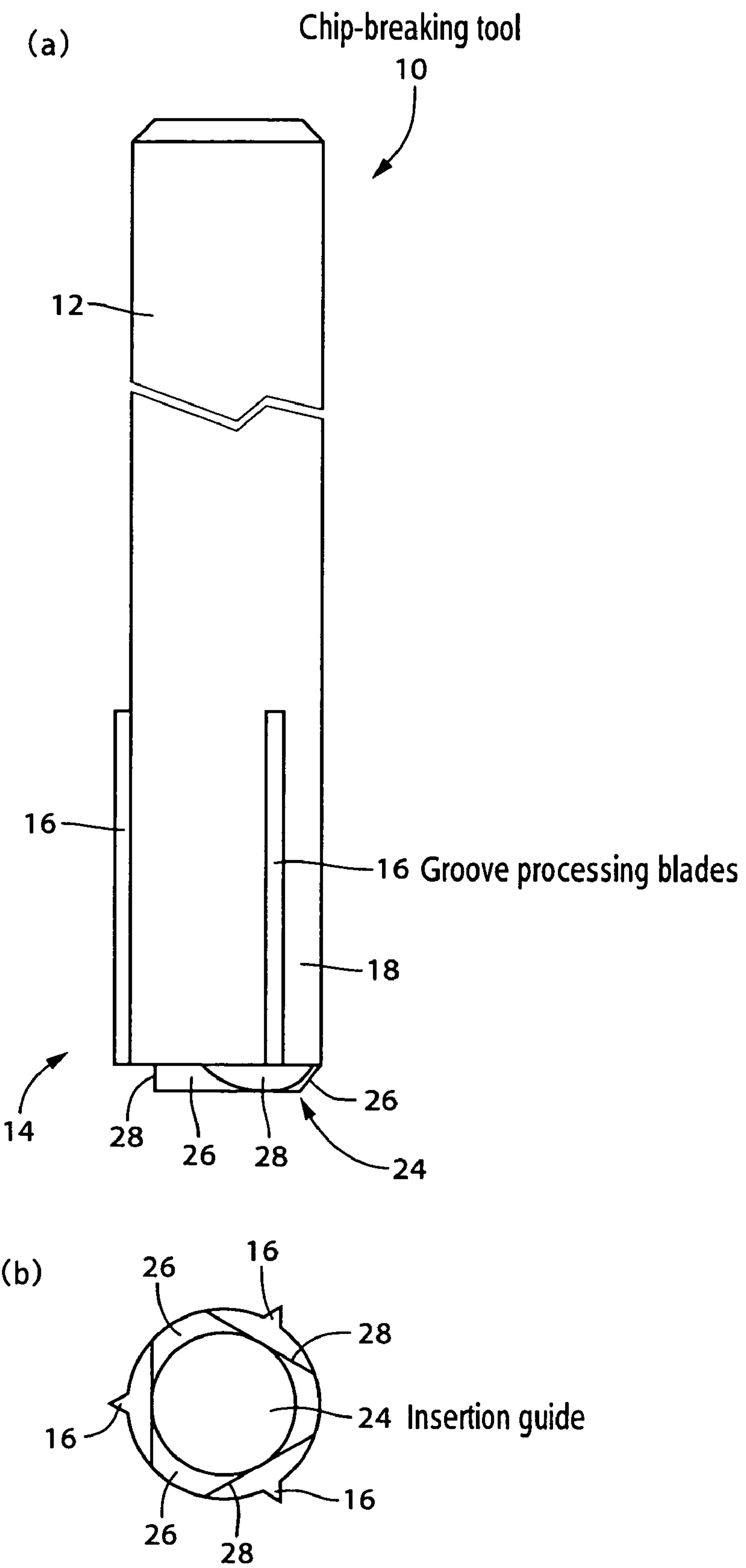

FIGS. 1A and 1B are views showing a chip-breaking tool 10 for tapping in accordance with an embodiment of the present invention, in which FIG. 1A is a front elevational view as seen from a direction perpendicular to an axis, and FIG. 1B is a bottom elevational view as seen from a leading end side. The chip-breaking tool 10 is inserted into a prepared hole 22 previously provided in a work 20 as shown in FIG. 2 from a leading end side, thereby cutting a chip-breaking groove 30 shown in FIG. 3 in an inner peripheral surface of the prepared hole 22. The chip-breaking tool 10 is structured by a high speed tool steel or the like, and is integrally provided with a cylindrical shank 12 and blade portion 14 in an axial direction. Three groove processing blades 16 for cutting the chip-breaking groove 30 are provided in an outer peripheral surface of the blade portion 14 around an axis at a uniform angular interval. The blade portion 14 is provided with a cylindrical outer peripheral surface 18 having a diameter which is slightly smaller than an inner diameter of the prepared hole 22, and is inserted to the prepared hole 22 in a state of being approximately concentrically positioned to the prepared hole 22 by the cylindrical outer peripheral surface 18. In the blade portion 14, a cylindrical portion having a diameter which is slightly smaller than the prepared hole 22 corresponds to a main body portion.

Each of three groove processing blades 16 is formed in an approximately triangular cross sectional shape, is integrally provided in the blade portion 16 such that an apex protrudes out to an outer peripheral side, for example, in accordance with a wire cut electric discharge processing or the like, has an axial length which is longer than a thickness of the work 20, that is, a length of a female thread 32 (refer to FIG. 4) to be processed, is formed linearly in parallel to an axis, and functions as a cut blade by a leading end in a axial direction. A diameter of the apex protruding to the outer peripheral side of the groove processing blade 16 is approximately equal to a root diameter of the female thread 32, and a notch-shaped chip-breaking groove 30 having an approximately triangular cross sectional shape is cut in an inner peripheral surface of the prepared hole 22 at approximately the same groove depth as that of a thread groove 34 of the female thread 32. FIG. 3 shows a state before the female thread 32 is tapped, and shows a position of a groove bottom of the thread groove 34 of the female thread 32 by a single-dot chain line for comparing with the chip-breaking groove 30. FIGS. 3A and 4A are plan views and FIGS. 3B and 4B are cross sectional views along a line B—B of FIGS. 3A and 4A.

The chip-breaking tool 10 is also integrally provided with an insertion guide 24 in a leading end portion thereof. The insertion guide 24 is formed in a taper shape in which a diameter becomes smaller toward a leading end side from a large-diameter portion having the same diameter of the cylindrical outer peripheral surface 18 and being equal to a diameter of the prepared hole 22, and is inserted into the prepared hole 22 such as to be approximately concentric with the prepared hole 22 by the taper surface 26. Further, a portion in the insertion guide 24 which matches with the groove processing blade 16 is partly notched, and there is provided with a chip pocket 28 which receives the chips cut by the groove processing blade 16 and discharges forward.

Further, in order to cut the female thread 32 in the work 20 by using the chip-breaking tool 10 mentioned above, the prepared hole 22 is first cut by downward moving the drill while rotating the drill around an axis by a three-axis processing machine (not shown) or the like. This step is a prepared hole processing step.

Next, the chip-breaking tool 10 is compressed into the prepared hole 22 while being guided such as to be approximately concentric with the prepared hole 22 by the insertion guide 24, by linearly moving the chip-breaking tool 10 to a leading end side in an axial direction, that is, to a lower side without rotating the chip-breaking tool 10 around the axis, as shown by an outline arrow in FIG. 2, after replacing the drill by the chip-breaking tool 10. Accordingly, the cutting process is applied to the inner peripheral surface of the prepared hole 22 by three groove processing blades 16, and notch-shaped three chip-breaking grooves 30 are cut. Each of the chip-breaking grooves 30 is formed in a linear shape parallel to a center line of the prepared hole 22 as shown in FIG. 3, and a groove depth of the chip-breaking groove 30 is approximately equal to a groove depth of the thread groove 34 of the female thread 32. This step is a groove processing step.

In this case, the work 20 is made of a material having a high ductility such as SS400, an aluminum and the like, and the chip-breaking groove 30 can be comparatively easily cut only by compressing the chip-breaking tool 10 in the axial direction. In this case, it is possible to employ a die having a cutting blade corresponding to the groove processing blade 16 as occasion demands. Further, since the chip pocket 28 is provided in the insertion guide 24 in correspondence to the groove processing blade 16, the chip cut by the groove processing blade 16 is well discharged to a front side (a lower side in the embodiment) from the chip pocket 28, and it is possible to prevent the chips from being pinched between the insertion guide 24 and the prepared hole 22, whereby it is possible to prevent the working load from being increased and prevent the scratch from being formed in the inner peripheral surface of the prepared hole 22. Further, when the leading end of the groove processing blade 16 protrudes to an opposite side (a lower side) of the prepared hole 22 and the cutting process of the chip-breaking groove 30 is finished, it is preferable to stop the downward moving of the chip-breaking tool 10 so as to pull out to an upper side as it is. However, in the present embodiment, since the length of the blade portion 14 of the chip-breaking tool 10, that is, the length of the groove processing blade 16 is larger than a thickness of the work 20, a rear end of the groove processing blade 16 protrudes to an upper side of the prepared hole 22 and it is possible to easily pull out the groove processing blade 16.

Thereafter, the female thread 32 is cut as shown in FIG. 4, by replacing the chip-breaking tool 10 by a cut tap (not shown), moving the cut tap to the leading end side in the axial direction while rotating the cut tap around the axis in correspondence to a lead of the female thread 32, and screwing into the prepared hole 22 from a chamfer portion side so as to tap. In the present embodiment, only the thread groove 34 is cut such that the inner peripheral surface of the prepared hole 22 structures a crest of the female thread 32 as it is, and the inner diameter of the prepared hole 22 forms the inner diameter of the female thread 32 as it is. When the tapping is finished, the cut tap is pulled out by being moved to the upper side while being reverse rotated around the axis in correspondence to the lead of the female thread 32. This step is a tapping step.

Figure 10:
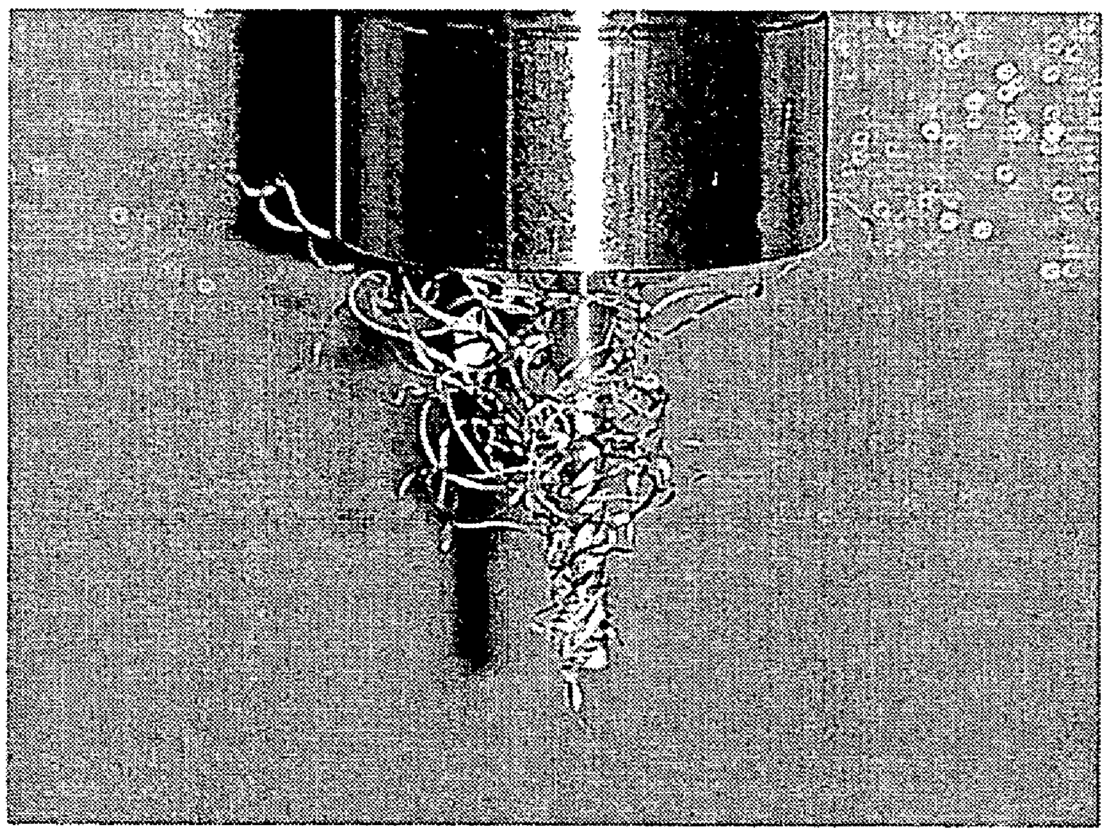
FIG. 10 is a view showing a state in which a lot of long connected chips entwine the cut tap without being broken at a time of tapping.

As mentioned above, since the chip-breaking groove 30 is cut in the inner peripheral surface of the prepared hole 22 by compressing the chip-breaking tool 10 into the prepared hole 22 prior to the tapping process (the cutting process of the female thread) by the cut tap, the chip can be securely broken by the chip-breaking groove 30 and well discharged even in the case that the work 20 is made of the material having the high ductility. Accordingly, for example, as shown in FIG. 10, it is possible to prevent a lot of long connected chips from entwining the tap, it is unnecessary to monitor the tapping work, and it is possible to achieve a complete automation (an unmanned work). Further, it is possible to inhibit the cut tap from being broken due to the pinching of the chip, and it is easy to execute a treatment such as a chip cleaning or the like.

On the other hand, the female thread 32 obtained by tapping is broken by the chip-breaking groove 30, however, since it is sufficient that the chip-breaking groove 30 can break the chips generated at a time of tapping, and the notch-shaped chip-breaking groove 30 having the approximately triangular cross sectional shape is formed is formed at approximately the same groove depth as the thread groove 34 of the female thread 32, the strength of the female thread 32 becomes higher in comparison with the case that the large notch corresponding to the land of the tap is provided as in the patent document 1 mentioned above, and it is possible to secure the predetermined screwing strength even by the material having the high ductility.

Further, since the blade portion 14 is provided with the cylindrical outer peripheral surface 18 having the diameter which is approximately equal to the inner diameter of the prepare hole 22, and is inserted into the prepared hole 22 in a state of being positioned approximately concentric with the prepared hole 22 by the cylindrical outer peripheral surface 18, it is possible to process the chip-breaking groove 30 easily at a high accuracy.

Further, since the taper-shaped insertion guide 24 is integrally provided in the leading end side of the blade portion 14, it is possible to easily and securely insert the chip-breaking tool 10 into the prepared hole 22 so as to cut the chip-breaking groove 30.

Further, since the chip pocket 28 is provided in the insertion guide 24 in correspondence to the groove processing blade 16, the chip cut by the groove processing blade 16 is well discharged to the front side from the chip pocket 28, so that it is possible to prevent the chip from being pinched between the insertion guide 24 and the prepared hole 22, whereby it is possible to prevent the processing load from being increased and prevent the scratch from being formed in the inner peripheral surface of the prepared hole 22.

Further, since the chip-breaking tool 10 in accordance with the present embodiment is integrally provided with the shank 12 in the axial direction, and is independently mounted to the machine tool so as to be used, the chip-breaking tool 10 can be used in common with the tapping process of plural kinds of female threads 32 having the different pitches as far as the diameter of the prepared hole 22 is fixed. Further, in comparison with the case of being integrally provided in the cut tap and the drill, each of the tools can be used until reaching a tool life due to an abrasion, a damage or the like, and it is possible to effectively utilize each of the tools.

Next, a description will be given of another embodiment in accordance with the present invention. In this case, in the following embodiment, the same reference numerals are attached to portions which are substantially in common with the embodiment mentioned above, and a detailed description thereof will be omitted.

FIG. 5 shows a composite tool in which a chip-breaking tool 42 is coaxially and integrally provided in a leading end portion of a cut tap 40 for tapping the female thread 32. The chip-breaking tool 42 is provided with three groove processing blades 16, the cylindrical outer peripheral surface 18, and the insertion guide 24, is structured substantially in the same manner as that of the blade portion 14, and is integrally provided in the cut tap 40 via a long connection portion 44 which is smaller than the diameter of the lower hole 22 and is longer than the length of the female thread 32 (the thickness of the work 20).

In the composite tool mentioned above, since the chip-breaking groove 30 is cut in the inner peripheral surface of the prepared hole 22 by the chip-breaking tool 42 prior to the tapping process by the cut tap 40, whereby the chip generated at a time of tapping is securely broken so as to be well discharged, the same effects as those of the embodiment mentioned above can be obtained. In addition, since the chip-breaking tool 42 is integrally provided in the leading end portion of the cut tap 40, it is possible to continuously and efficiently execute the tapping process (the tapping step) by the cut tap 40 without changing the tool, subsequently after the process of the chip-breaking groove 30 by the chip-breaking tool 42 (the groove processing step). In this case, in order to pull out the chip-breaking tool 42 from the female thread 32 after the tapping process by the cut tap 40, it is preferable to pull the tool in a state of matching the chip-breaking groove 30 existing in the female thread 32 with the groove processing blade 16.

FIG. 6 shows a composite tool in which a chip-breaking tool 52 is coaxially and integrally provided in a drill 50 for cutting the prepared hole 22. The chip-breaking tool 52 is provided with three groove processing blades 16, the cylindrical outer peripheral surface 18, and the insertion guide 24, is structured substantially in the same manner as that of the blade portion 14, and is integrally provided in a front end portion of a shank 54, that is, a portion between a groove portion 56 and the shank 54. In this case, a small-diameter portion 58 is provided between the groove portion 56 and the insertion guide 24, and the chip cut by the groove processing blade 16 is discharged via an annular space in an outer peripheral side of the small-diameter portion 58.

In accordance with the composite tool mentioned above, since the chip-breaking groove 30 is cut in the inner peripheral surface of the prepared hole 22 by the chip-breaking tool 52 subsequently after the cutting process of the prepared hole 22 by the drill 50, the chip generated at a time of tapping is securely broken and well discharged, so that the same effects as those of the embodiments mentioned above can be obtained. In addition, since the chip-breaking tool 52 is integrally provided in the drill 50, it is possible to continuously and efficiently execute the process of the chip-breaking groove 30 (the groove working step) by the chip-breaking too 152 subsequently after the prepared hole processing (the prepared hole processing step) by the drill 50, without changing the tool. Further, in the case that the diameter of the prepared hole 22 is fixed, the tool can be used in common with the tapping process of plural kinds of female threads 32 having different pitches.

Figure 7:
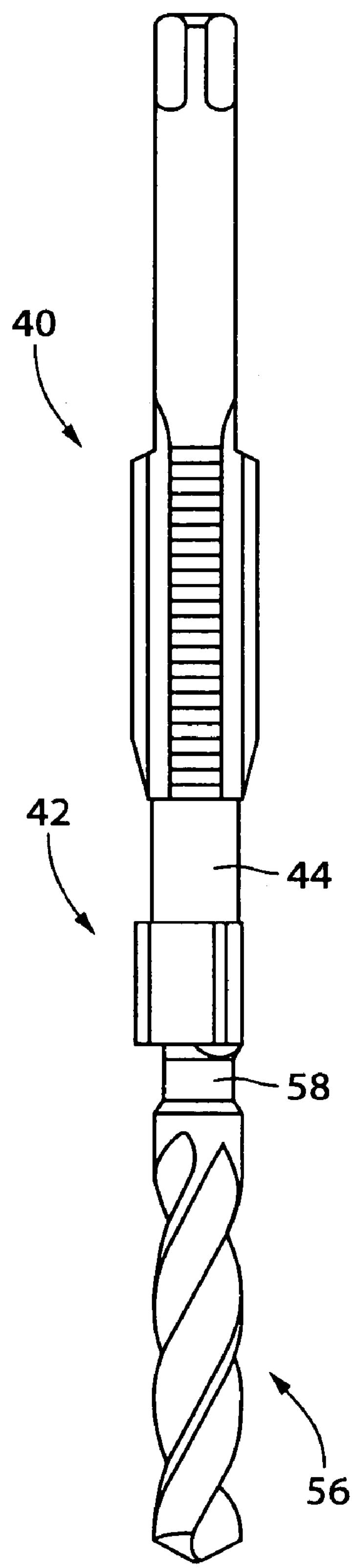
FIG. 7 is a view showing further the other embodiment in accordance with the present invention, which corresponds to a case that the chip-breaking tool is integrally provided in the cut tap and the drill.

FIG. 7 shows a structure in which the groove portion 56 of the drill 50 shown in FIG. 6 is coaxially and integrally provided in the leading end side of the composite tool shown in FIG. 5 via the small-diameter portion 58. Since the chip-breaking groove 30 is cut in the inner peripheral surface of the prepared hole 22 by the chip-breaking tool 42 subsequently after the cutting process of the prepared hole 22 by the groove portion 56, whereby the chip generated at a time of tapping is securely broken so as to be well discharged, the same effects as those of the embodiments mentioned above can be obtained. Further, since the chip-breaking tool 42 is integrally provided in the groove portion 56 serving as the cut tap 40 and the drill, it is possible to execute the process of the chip-breaking groove 30 (the groove processing step) by the chip-breaking tool 42 and the tapping process (the tapping step) by the cut tap 40, subsequently after the prepared hole processing (the prepared hole processing step) by the groove portion 56, without changing the tool. In this case, in order to pull out the chip-breaking tool 42 from the female thread 32 after the tapping process by the cut tap 40, it is preferable to pull out the tool in a state of matching the chip-breaking groove 30 existing in the female thread 32 with the groove processing blade 16.

Figure 8:
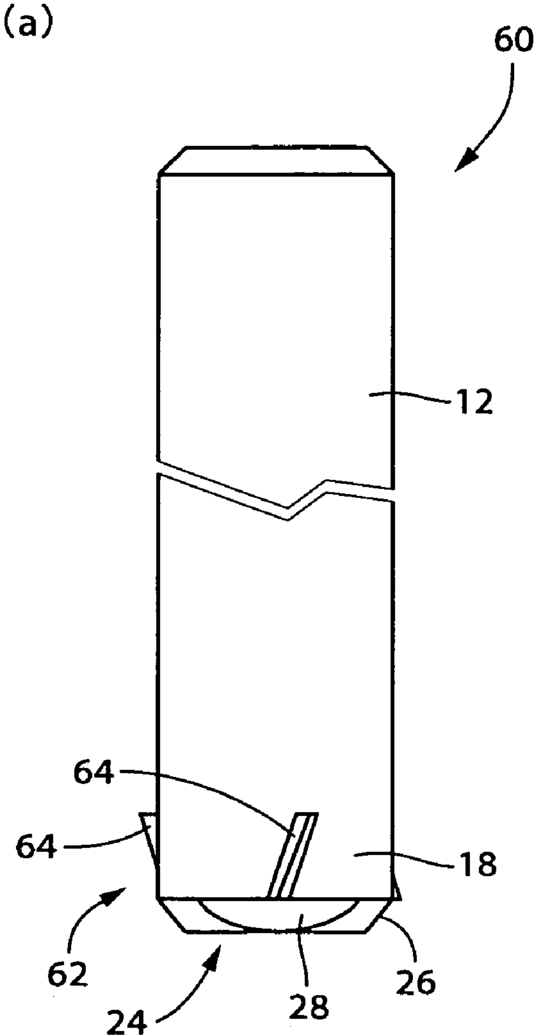
FIG. 8 is a view showing further the other embodiment in accordance with the present invention, which corresponds to a case that a groove processing blade is provided so as to be twisted around an axis, and corresponds to FIG. 1.
Figure 8:
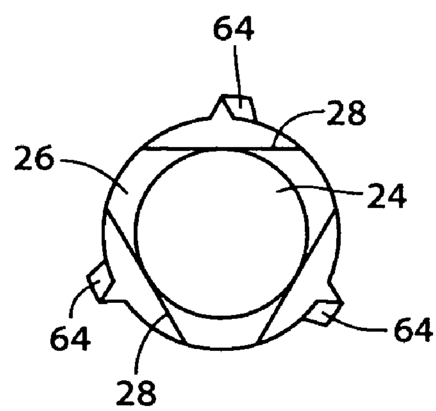

A chip-breaking tool 60 in FIG. 8 corresponds to a case that a groove processing blade 64 of a blade portion 62 is twisted at a predetermined angle of torsion. The tool is screwed into the prepared hole 22 along the torsion, thereby cutting a spiral chip-breaking groove, so that it is possible to substantially obtain the same operations and effects as those of the chip-breaking tool 10. The torsion angle of the groove processing blade 64 may be appropriately set such as to cross to the thread groove 34 of the tapped female thread 32, and it is generally preferable to employ a comparatively small torsion angle equal to or less than about 30 degree. In the blade portion 62, the cylindrical portion having the diameter slightly smaller than the prepared hole 22 corresponds to the main body portion. In this case, since a length of the blade portion 62, that is, an axial length of the groove processing blade 64 is comparatively short in this embodiment, there is a risk that the groove processing blade 64 completely enters into the chip-breaking groove. However, the groove processing blade 64 can be pulled out from the prepared hole 22 by being moved backward in the axial direction while being reversely rotated along the processed chip-breaking groove. FIG. 8 is a view corresponding to FIG. 1 mentioned above, in which FIG. 8A is a front elevational view and FIG. 8B is a bottom elevational view as seen from a leading end side. Further, the blade portion 62 having the groove processing blade 64 may be provided in place of the chip-breaking tools 42 and 52 of the complex tool shown in FIGS. 5 to 7.

Figure 9:
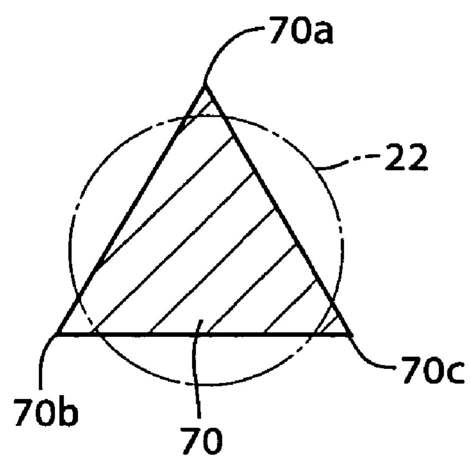
FIG. 9 is a cross sectional view describing further the other several embodiments in accordance with the present invention.
Figure 9:
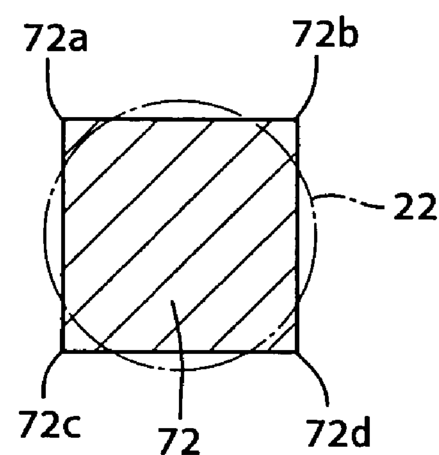
Figure 9:
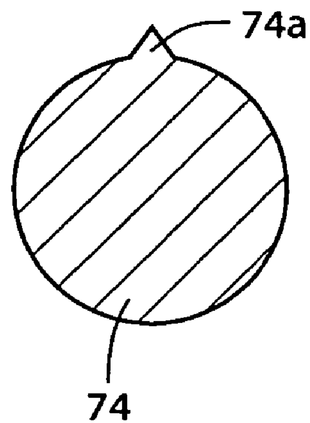

FIGS. 9A to 9C are views describing the other aspects of the chip-breaking tool, in which FIG. 9A shows a case that a cross section of a main body portion 70 is triangular, and three apexes 70*a* to 70*c* having a diameter larger than the prepared hole 22 are used as the groove processing blade as they are, FIG. 9B shows a case that a cross section of a main body portion 72 is square, and four apexes 72*a* to 72*d* having a diameter larger than the prepared hole 22 are used as the groove processing blade as they are, and FIG. 9C shows a case that a cross section of a main body portion 74 is a circular shape having a diameter which is slightly smaller than the prepared hole 22 in the same manner as the chip-breaking tools 10 and 60, and a single groove processing blade 74*a* is provided. The main body portions 70 and 72 mentioned above may be formed in a straight rectangular column, however, may be twisted at a predetermined torsion angle and structured such that the apexes 70*a* to 70*c* and 72*a* to 72*d*, that is, the groove processing blades are twisted around the axes. The groove processing blade 74*a* shown in FIG. 9C may be straight as the groove processing blade 16, or may be twisted as the groove processing blade 64.

The description is in detail given above of the embodiments in accordance with the present invention with reference to the drawings, however, the present invention can be carried out in accordance with various modifications and improvements on the basis of the knowledge of those skilled in the art.

What is claimed is:

1. A chip-breaking tool for tapping which prevents chips from being long connected and discharged at a time of screwing a cut tap into a prepared hole so as to cut a female thread, comprising:

a main body portion which is inserted into said prepared hole prior to a cutting process of said female thread by said cut tap; and a groove processing blade which is integrally provided on said main body portion and forms a chip-breaking groove in an inner peripheral surface of said prepared hole, wherein said groove processing blade cuts a notch-shaped chip-breaking groove having an approximately triangular cross section, and a diameter of said groove processing blade is approximately equal to a root diameter of said female thread.

2. A chip-breaking tool for tapping as claimed in claim 1, characterized in that said main body portion is provided with a cylindrical outer peripheral surface having a diameter which is approximately equal to an inner diameter of said prepared hole, and is inserted into said prepared hole in a state of being positioned approximately concentric to said prepared hole by said cylindrical outer peripheral surface.

3. A chip-breaking tool for tapping as claimed in claim 1, characterized in that a taper-shaped insertion guide in which a diameter is smaller toward a leading end side from a large-diameter portion approximately equal to a diameter of said prepared hole is provided in a leading end of said main body portion.

4. A chip-breaking tool for tapping as claimed in claim 3, characterized in that said groove processing blade forms said chip-breaking groove in accordance with a cutting process, and a portion matching to said groove processing blade in said insertion guide is partly notched, and is provided with a chip pocket-which receives the chips cut by said groove processing blade and discharge forward.

5. A chip-breaking tool for tapping as claimed in claim 1, characterized in that said main body portion is integrally provided with a shank in an axial direction, and is independently mounted to a machine tool so as to be used.

6. A chip-breaking tool for tapping as claimed in claim 1, characterized in that said main body portion having said groove processing blade is integrally provided in a leading end portion of said cut tap.

7. A chip-breaking tool for tapping as claimed in claim 1, characterized in that said main body portion having said groove processing blade is integrally provided between a groove portion of a drill cutting said prepared hole and a shank.

8. A chip-breaking tool for tapping as claimed in claim 1, characterized in that said main body portion having said groove processing blade is integrally provided between a drill of a cut tap with said drill and said cut tap.

9. A female thread processing method of screwing a cut tap into a prepared hole so as to cut a female thread, characterized by comprising:

a groove processing step of forming a chip-breaking groove in an inner peripheral surface of said prepared hole so as to cross to a thread groove of said female thread prior to a cutting process of said female thread by said cut tap.

10. A female thread processing method as claimed in claim 9, wherein said chip-breaking groove is provided such that a bottom diameter is approximately equal to a root diameter of said female thread.

* * * * *